United States Patent [19]
O'Keefe et al.

[11] Patent Number: 5,962,782
[45] Date of Patent: Oct. 5, 1999

[54] GRAVITY GRADIOMETER ACCELEROMETERS

[75] Inventors: Graeme Joseph O'Keefe, Victoria; James Beresford Lee, New South Wales; Robert John Turner, New South Wales; Gregory John Adams, New South Wales; Graham Clifford Goodwin, New South Wales, all of Australia

[73] Assignee: The Broken Hill Proprietary Company Limited, Victoria, Australia

[21] Appl. No.: 08/888,036

[22] Filed: Jul. 3, 1997

[30] Foreign Application Priority Data

Jun. 11, 1997 [AU] Australia ................. PO 7319
Jun. 12, 1997 [AU] Australia ................. PO 7315

[51] Int. Cl.[6] .................................................. G01V 7/00
[52] U.S. Cl. ............... 73/382 R; 73/178 R; 73/382 G
[58] Field of Search ................. 73/382 G, 382 R, 73/178 R, 514.19; 33/326; 324/244–249

[56] References Cited

U.S. PATENT DOCUMENTS

| | | | |
|---|---|---|---|
| 2,674,885 | 4/1954 | Silverman ............................. | 73/382 R |
| 3,242,736 | 3/1966 | Winter et al. ........................ | 73/178 R |
| 3,477,293 | 11/1969 | Brede .................................. | 73/382 R |
| 3,633,003 | 1/1972 | Talwani .............................. | 73/382 R |
| 3,731,538 | 5/1973 | Jacoby ................................ | 73/382 R |
| 4,245,510 | 1/1981 | Baker .................................. | 73/382 R |
| 4,386,318 | 5/1983 | Burbank et al. ..................... | 324/244 |
| 4,515,013 | 5/1985 | Hue ..................................... | 73/170.01 |
| 4,601,206 | 7/1986 | Watson ................................ | 73/510 |

FOREIGN PATENT DOCUMENTS

| | | |
|---|---|---|
| K9943B/47 | 3/1979 | Australia . |
| 2088564 | 6/1982 | United Kingdom . |
| WO95/05614 | 2/1995 | WIPO . |

*Primary Examiner*—Hezron Williams
*Assistant Examiner*—Helen C. Kwok
*Attorney, Agent, or Firm*—Olson & Hierl, Ltd.

[57] ABSTRACT

This invention concerns improvements to gravity gradient instruments (GGI) and in particular to the accelerometers that are paired within these instruments. Accelerometers have a proof mass suspended by a spring within a magnetic field. An internal feedback loop provides a signal related to movement of the proof mass back through a reaction coil retaining the proof mass in the magnetic field, to maintain the proof mass stationary. An external feedback loop adjusts the accelerometer scale factor. The internal feedback loop provides second order compensation to the proof mass and the spring stiffness. In a further aspect the invention is a method of matching accelerometer pairs.

4 Claims, 1 Drawing Sheet

GRAVITY GRADIOMETER ACCELEROMETERS

TECHNICAL FIELD

This invention concerns improvements to gravity gradient instruments (GGI), and in particular to the accelerometers that are paired within these instruments.

BACKGROUND ART

The GGI consists of two pairs of high quality, low noise, matched accelerometers mounted on a block. Each of the accelerometers has an internal feedback loop for proper operation, and an external feedback loop for trim adjustment of the accelerometer scale factor and alignment of the accelerometer sensitive axis.

The normal configuration has the accelerometers mounted in opposing pairs, and equally spaced around the circumference of a circle, with their sensitive axes tangential to the circle. In use the block is rotated about a spin axis which is perpendicular to the plane of the circle, and passes through the centre of the circle. The outputs of the accelerometers of each pair are differenced and the difference signals are then combined. The overall effect is that the large common mode accelerometer output signals cancel to a high degree of precision, so that the residual differences which constitute the gradient signal are observable.

The accelerometers must be matched in their pairs so that the current/acceleration transfer function is matched in amplitude and phase at all frequencies of interest, to an accuracy of 1 part in $10^{10}$. The mismatch in accelerometer pairs is a result of the difference of the internal feedback closed loop errors, and thus the mismatch is also inversely proportional to the open loop gain. The existing external feedback scale factor adjustment can degrade, by an order of magnitude, the high frequency (>1 Hz) lateral sensitivity for a 2% mismatch within the accelerometers. The influence of vertical acceleration on the accelerometers is an additional complicating factor.

SUMMARY OF THE INVENTION

The invention, as currently envisaged, is an accelerometer having a proof mass suspended by a spring within a magnetic field. An internal feedback loop provides a signal related to movement of the proof mass back through a reaction coil retaining the proof mass in the magnetic field, to maintain the proof mass stationary. An external feedback loop adjusts the accelerometer scale factor. Wherein, the internal feedback loop provides second order compensation to the proof mass and the spring stiffness.

The internal feedback path may include high gain to reduce errors in the accelerometer transfer function.

A compensator in the internal feedback loop may provide double pole and double zero compensation:

$$\frac{m_1 s^2 + k_1}{m_0 s^2 + k_0}$$

where:

$m_1$ is the mass of the proof mass
$k_1$ is the spring constant of the spring
$m_0$ is a nominal proof mass and
$k_0$ is a nominal spring constant.

The nominal proof mass and spring constant represent the accelerometer characteristics to which both accelerometers of a pair are to be matched in order that the two accelerometers are closely matched to each other.

In a GGI the compensation provided by the internal feedback loop may correct for the mass ratio (to Fo frequency ratio) mismatch between two paired accelerometers by providing the $s^2$ loop gain term as a mass compensation. The compensation may also correct for the spring ratio by providing a loop gain term which lumps together variations in pick-off gain, integrator capacitors and spring constant, as a spring stiffness k compensator.

The components of the compensation network are typically resistors and capacitors. Variable components are introduced so that the break frequencies can be turned over a ±5% range to match the masses m and the spring stiffnesses k of the accelerometer pairs to better than 0.5%. The closed loop gain blocks are trimmed in pairs to match the time constants to within 0.5%.

In a further aspect the invention is a method of matching accelerometer pairs, comprising the steps of:

Testing the pair of accelerometers in back to back fixtures on a horizontal shaker which is aligned to the same vertical angle as in the GGI.

Selecting the accelerometers on the basis of the best scale factor match at 0.5 Hz and the lowest lateral sensitivity at 10 Hz.

Applying horizontal excitation at 0.25 Hz, 1 Hz and 10 Hz (or higher) and detecting the system responses with synchronous demodulation at the frequencies. A scale factor loop may be driven from the 0.25 Hz signal or it may be adjusted manually while the excitation is applied.

Adjusting second order mass compensation to minimise the in phase (I) and the quadrature (Q) components of the signal at 10 Hz.

Adjusting second order spring stiffness compensation to minimise the components at 1 Hz.

Iteratively repeating the adjusting steps to achieve matches better than 0.5%.

The external feedback path may provide the output signal, demodulated at the spin frequency $\Omega$ by a demodulator, to correct for mismatches in the strength B of the magnets in accelerometers. This feedback loop may also compensate for some part of the mismatches in proof mass and spring stiffness.

BRIEF DESCRIPTION OF THE DRAWINGS

An example of the invention will now be described with reference to FIG. 1 which is a schematic diagram of a modified accelerometer pair embodying the present invention.

BEST MODES FOR CARRYING OUT THE INVENTION

Figure 1:
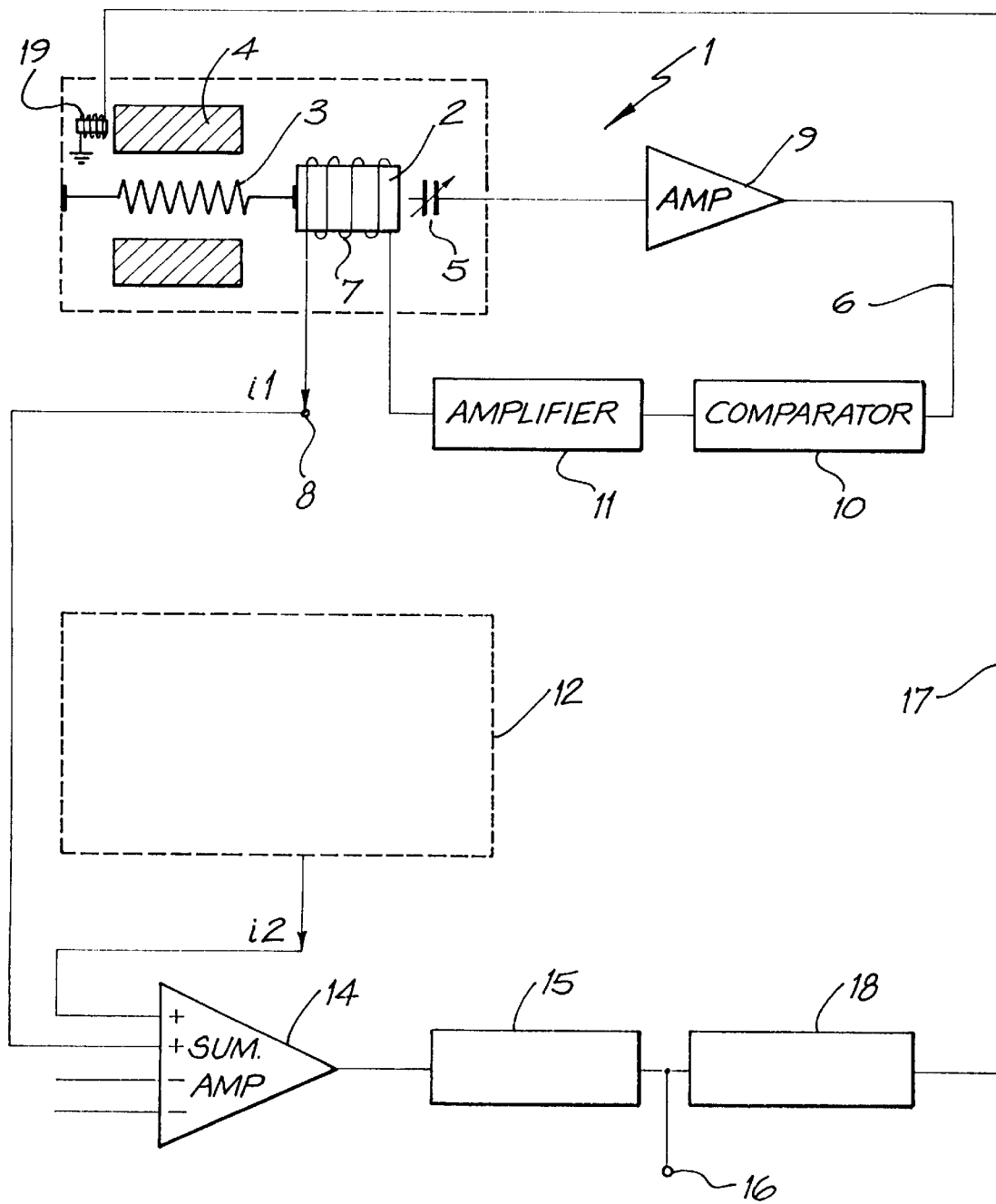
Figure 1:
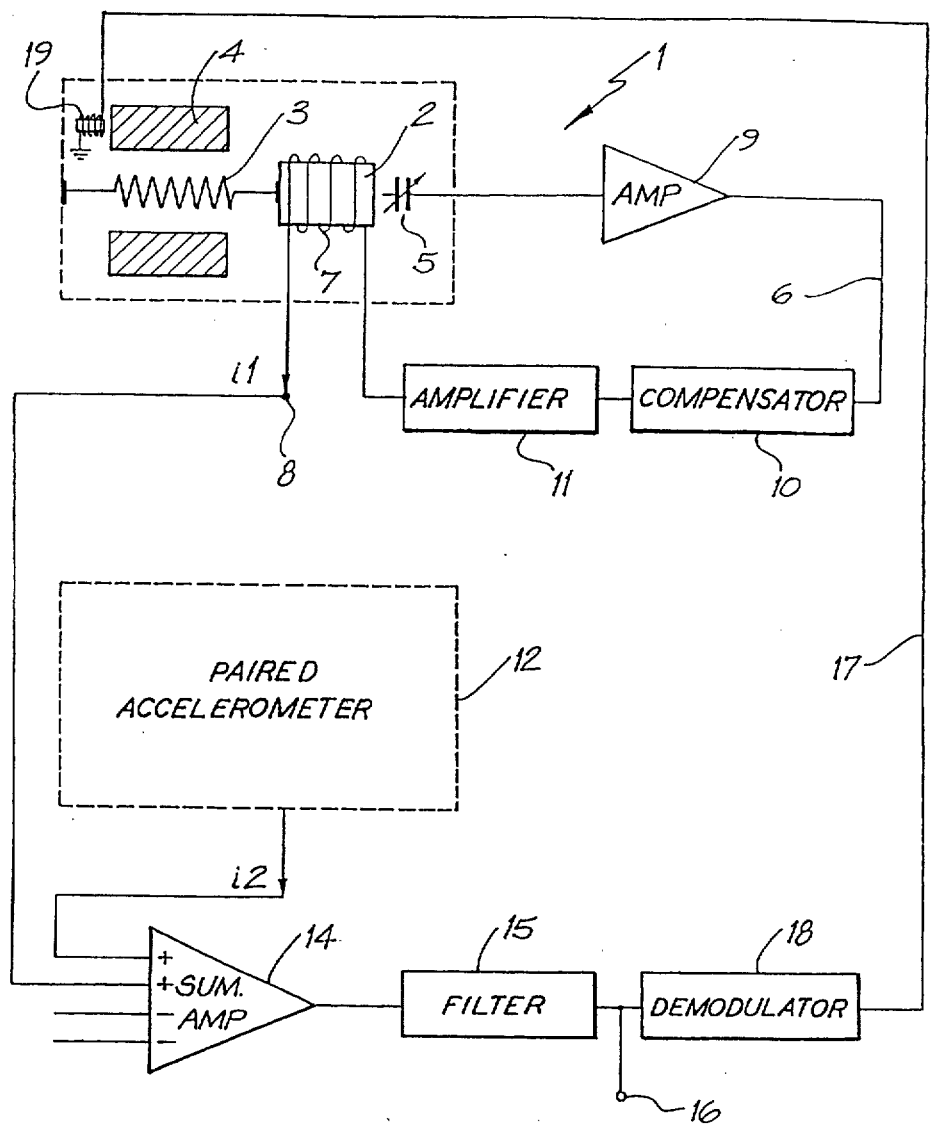

Accelerometer 1 comprises a proof mass 2 suspended by a spring 3 in a magnetic field provided by magnet 4. The proof mass 2 is associated with a position sensor 5 which provides a feedback signal through feedback loop 6 to a reaction coil 7 that retains the proof mass 2. The current i1 flowing through coil 7 is taken as an output from output port 8.

Feedback loop 6 includes a position sensor amplifier 9, a compensation network 10 and another amplifier 11 arranged in series. In use an external acceleration causes a force to be applied to the proof mass 2 within accelerometer 1. Any tendency to movement of the proof mass 2 causes a current to flow in feedback loop 6 and through coil 7. The current flowing through retaining coil 7 in the magnetic field provided by magnet 4 causes an equal and opposite force to be applied to the proof mass 2 to compensate for the tendency to movement. The current i1 flowing through the coil 7 is therefore a measure of the acceleration applied to the proof mass.

In a GGI the accelerometers are arranged in opposing pairs and the output i1 from accelerometer 1 is added to the output i2 from its paired accelerometer 12 and is combined with the output signals from the other pair of accelerometers in the GGI, in a summing amplifier 14, and the output is then filtered 15 to provide a signal to the instrument output 16.

An external feedback path 17 provides the output signal, demodulated at the spin frequency Ω by demodulator 18, to be applied to a small electromagnet 19 associated with the magnet 4. This feedback signal corrects for mismatches between the strength B of the magnet 4 in accelerometer 1 and the strength of the magnet in accelerometer 12. This feedback loop will also compensate for some part of the mismatches in proof mass m and spring stiffness k; in particular the compensation matches the real component of the of mismatch at the spin frequency, but it cannot match at any other frequency or match the imaginary component of the mismatch. Below 2 Hz the dominant parameters affecting mismatch are the spring constant k difference. Above 2 Hz the dominant parameters are the proof mass m differences. At the preferred frequency of operation, below 1 Hz, the external feedback loop can be thought of as providing dynamic correction for the magnetic field ratio B/k where B is the magnetic field strength and k is the spring stiffness.

The internal feedback path 6 includes high gains from the two amplifiers 9 and 11 to reduce errors in the accelerometer transfer function. This error reduction, as a function of frequency, is inversely proportional to the loop gain at that frequency. It follows that the mismatch in accelerometer pairs is a result of the difference of the closed loop errors.

The compensator 10 in the feedback loop 6 provides double pole and double zero compensation:

$$\frac{m_1 s^2 + k_1}{m_0 s^2 + k_0}$$

where:

$m_1$ is the mass of the proof mass $k_1$ is the spring constant of the spring $m_0$ is a nominal proof mass and $k_0$ is a nominal spring constant.

This compensation corrects for the mass ratio (or Fo frequency ratio) by providing an $s^2$ loop gain term as a mass compensator. The compensation also corrects for the spring ratio by providing a loop gain term which lumps together variations in pick-off gain, integrator capacitors and spring constant, as a spring stiffness k compensator.

The components of the compensation network 10 are typically resistors and capacitors. Variable components are introduced so that the break frequencies can be tuned over a ±5% range to match the masses m and the spring stiffnesses k of the accelerometer pairs to better than 0.5%. The closed loop gain blocks are trimmed in pairs to match the time constants to within 0.5%.

The accelerometer pairs are then tested in back to back fixtures on a horizontal shaker.

The accelerometers are selected on the basis of the best scale factor match at 0.5 Hz and the lowest lateral sensitivity at 10 Hz. Horizontal excitation at 0.25 Hz, 1 Hz and 10 Hz (or higher) is input and the system response is detected with synchronous demodulation at these frequencies. A scale factor loop may be driven from the 0.25 Hz signal or it may be adjusted manually while the excitation is applied. The mass compensation is adjusted to minimise the in phase (I) and the quadrature (Q) components of the signal at 10 Hz, while the spring stiffness compensation is adjusted to minimise the components at 1 Hz. The compensations are adjusted iteratively to achieve matches better than 0.5% since there is some interaction between the parameters.

It should be appreciated that although the invention has been described with reference to a particular example it could be embodied in many other forms. For instance, alternative parameterisation is possible besides the magnetic field ratio B/k, mass ratio and spring ratio. However the compensation must provide second order correction.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

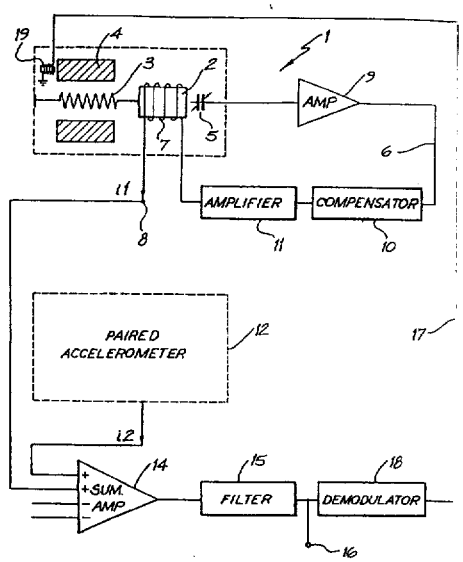

We claim:

1. A method for providing compensation in a gravity gradient instrument using at least one feedback loop internal to two paired accelerometers to correct for mismatch between the two paired accelerometers by providing a $s^2$ loop gain term as a mass compensator, the mismatch consisting of mass ratio mismatch, Fo frequency mismatch or mass ratio and frequency ratio mismatch between the two paired accelerometers.

2. The compensation method according to claim 1 including correcting for a spring ratio by providing a loop gain term which lumps together variations in pick-off gain, integrator capacitors and spring constant, as a spring stiffness k of the accelerometers.

3. The compensation method according to claim 2 including a compensation network having variable resistors or capacitors for tuning break frequencies over a ±5% range to match masses m and spring stiffness k of the accelerometers pairs to better than 0.5%.

4. The compensation method according to claim 3 wherein closed loop gain blocks are trimmed in pairs to match time constants to within 0.5%.

* * * * *

UNITED STATES PATENT AND TRADEMARK OFFICE
CERTIFICATE OF CORRECTION

PATENT NO. : 5,962,782
DATED : October 5, 1999
INVENTOR(S) : Graeme Joseph O'Keefe It is certified that error appears in the above-identified patent and that said Letters Patent is hereby corrected as shown below:

On the title page, figure 1 should be deleted to appear as per attached figure 1.
The title page, should be deleted to appear as per attached title page.-

Column 3, line 24, change "difference" to --differences--.
Column 4, line 5 of claim 3, delete "pairs".

Signed and Sealed this

Eighth Day of August, 2000

Q. TODD DICKINSON

Attest:

Attesting Officer

Director of Patents and Trademarks

United States Patent
O'Keefe et al.

[11] Patent Number: 5,962,782
[45] Date of Patent: Oct. 5, 1999

[54] GRAVITY GRADIOMETER ACCELEROMETERS

[75] Inventors: Graeme Joseph O'Keefe, Victoria; James Beresford Lee, New South Wales; Robert John Turner, New South Wales; Gregory John Adams, New South Wales; Graham Clifford Goodwin, New South Wales, all of Australia

[73] Assignee: The Broken Hill Proprietary Company Limited, Victoria, Australia

[21] Appl. No.: 08/888,036

[22] Filed: Jul. 3, 1997

[30] Foreign Application Priority Data

Jun. 11, 1997 [AU] Australia ............... PO 7319
Jun. 12, 1997 [AU] Australia ............... PO 7315

[51] Int. Cl.$^6$ ..................... G01V 7/00
[52] U.S. Cl. .......... 73/382 R; 73/178 R; 73/382 G
[58] Field of Search .................. 73/382 G, 382 R, 73/178 R, 514.19; 33/326; 324/244–249

[56] References Cited

U.S. PATENT DOCUMENTS

| | | | |
|---|---|---|---|
| 2,674,885 | 4/1954 | Silverman | 73/382 R |
| 3,242,736 | 3/1966 | Winter et al. | 73/178 R |
| 3,477,293 | 11/1969 | Brede | 73/382 R |
| 3,633,003 | 1/1972 | Talwani | 73/382 R |
| 3,731,538 | 5/1973 | Jacoby | 73/382 R |
| 4,245,510 | 1/1981 | Baker | 73/382 R |
| 4,386,318 | 5/1983 | Burbank et al. | 324/244 |
| 4,515,013 | 5/1985 | Hue | 73/170.01 |
| 4,601,206 | 7/1986 | Watson | 73/510 |

FOREIGN PATENT DOCUMENTS

| | | |
|---|---|---|
| K9943B/47 | 3/1979 | Australia. |
| 2088564 | 6/1982 | United Kingdom. |
| WO95/05614 | 2/1995 | WIPO. |

*Primary Examiner*—Hezron Williams
*Assistant Examiner*—Helen C. Kwok
*Attorney, Agent, or Firm*—Olson & Hierl, Ltd.

[57] ABSTRACT

This invention concerns improvements to gravity gradient instruments (GGI) and in particular to the accelerometers that are paired within these instruments. Accelerometers have a proof mass suspended by a spring within a magnetic field. An internal feedback loop provides a signal related to movement of the proof mass back through a reaction coil retaining the proof mass in the magnetic field, to maintain the proof mass stationary. An external feedback loop adjusts the accelerometer scale factor. The internal feedback loop provides second order compensation to the proof mass and the spring stiffness. In a further aspect the invention is a method of matching accelerometer pairs.

4 Claims, 1 Drawing Sheet